(12) United States Patent  (10) Patent No.: US 11,388,992 B2
Stockberger et al.  (45) Date of Patent: Jul. 19, 2022

(54) FOLDABLE MOBILE DEVICE STAND

(71) Applicants: Shayne M. Stockberger, Eden Prairie, MN (US); Juli R. Stockberger, Eden Prairie, MN (US)

(72) Inventors: Shayne M. Stockberger, Eden Prairie, MN (US); Juli R. Stockberger, Eden Prairie, MN (US)

( * ) Notice: Subject to any disclaimer, the term of this patent is extended or adjusted under 35 U.S.C. 154(b) by 0 days.

(21) Appl. No.: 17/303,354

(22) Filed: May 27, 2021

(65) Prior Publication Data
US 2021/0368975 A1 Dec. 2, 2021

Related U.S. Application Data

(60) Provisional application No. 63/032,948, filed on Jun. 1, 2020.

(51) Int. Cl.
    *F16M 11/00* (2006.01)
    *A47B 23/04* (2006.01)
    *F16M 11/20* (2006.01)

(52) U.S. Cl.
    CPC ....... *A47B 23/043* (2013.01); *F16M 11/2021* (2013.01)

(58) Field of Classification Search
None
See application file for complete search history.

(56) References Cited

U.S. PATENT DOCUMENTS

| 4,105,182 A * | 8/1978 | Jacobson | A47B 23/044 248/459 |
| 5,810,316 A | 9/1998 | Eby | |
| 8,282,065 B1 * | 10/2012 | Stone | A47B 23/044 16/221 |
| 8,887,903 B2 * | 11/2014 | Diebel | H04M 1/04 206/45.24 |
| 10,389,398 B1 | 8/2019 | Garcia | |
| 11,103,327 B2 * | 8/2021 | Sauer | A61B 50/24 |
| 11,167,583 B1 * | 11/2021 | Jarzombek | B42F 7/06 |
| 2011/0215217 A1 | 9/2011 | De La Garza | |

(Continued)

FOREIGN PATENT DOCUMENTS

| WO | WO2015-084775 | 6/2015 |
| WO | WO2017-034472 | 3/2017 |
| WO | WO2020-061345 | 3/2020 |

*Primary Examiner* — Steven M Marsh
(74) *Attorney, Agent, or Firm* — Allison Johnson, P.A.; Allison Johnson

(57) ABSTRACT

A foldable stand that includes a member that includes a positioning panel that includes at least one stop extending from an interior surface, a main body panel coupled to the positioning panel, the main body panel having an exterior surface and an interior surface opposite the exterior surface, and a support panel coupled to the main body panel, the support panel having an exterior surface, an interior surface opposite the exterior surface, and a leading edge, the positioning panel being foldable against the interior surface of the main body panel and, when folded, the interior surface of the positioning panel is in facing relationship with the interior surface of the main body panel, the support panel being foldable against the exterior surface of the positioning panel, when folded, the interior surface of the support panel is in facing relationship with the exterior surface of the positioning panel.

17 Claims, 10 Drawing Sheets

(56) References Cited

U.S. PATENT DOCUMENTS

| | | |
|---|---|---|
| 2014/0097319 A1* | 4/2014 | Robinson ............... F16M 11/10 |
| | | 248/456 |
| 2014/0197049 A1* | 7/2014 | Napolitano ............... A45F 5/02 |
| | | 206/45.24 |
| 2014/0263930 A1 | 8/2014 | Huebner |
| 2014/0262854 A1 | 9/2014 | Chen et al. |
| 2016/0066686 A1* | 3/2016 | Chiang ................ F16M 13/022 |
| | | 248/455 |
| 2016/0069508 A1 | 3/2016 | Haymond et al. |
| 2016/0219727 A1 | 7/2016 | McMahon |
| 2019/0038018 A1 | 2/2019 | Hill et al. |
| 2020/0208773 A1 | 7/2020 | Lin |
| 2021/0014348 A1 | 1/2021 | Lin |

* cited by examiner

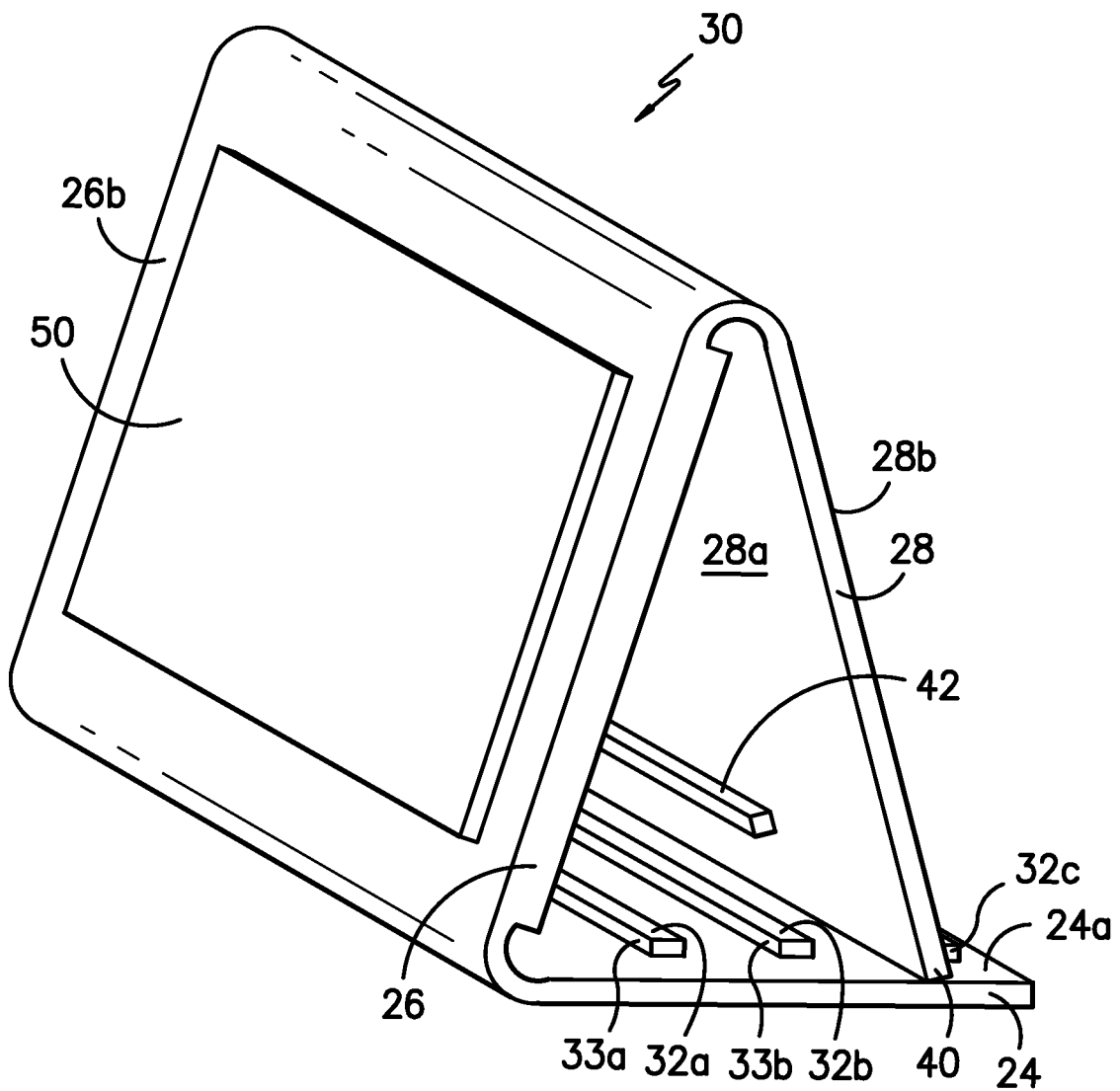
FIG. -1-

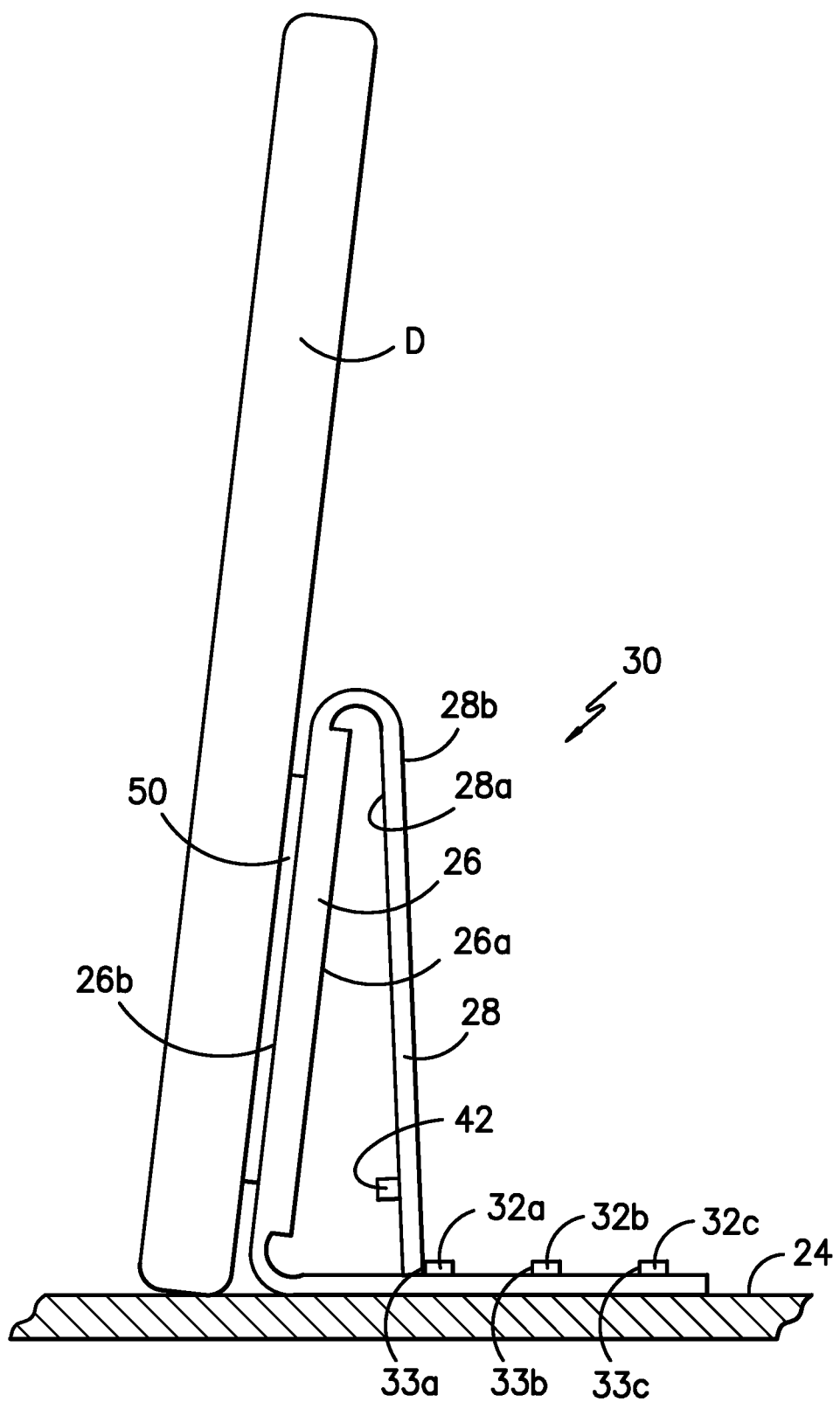
FIG. -2-

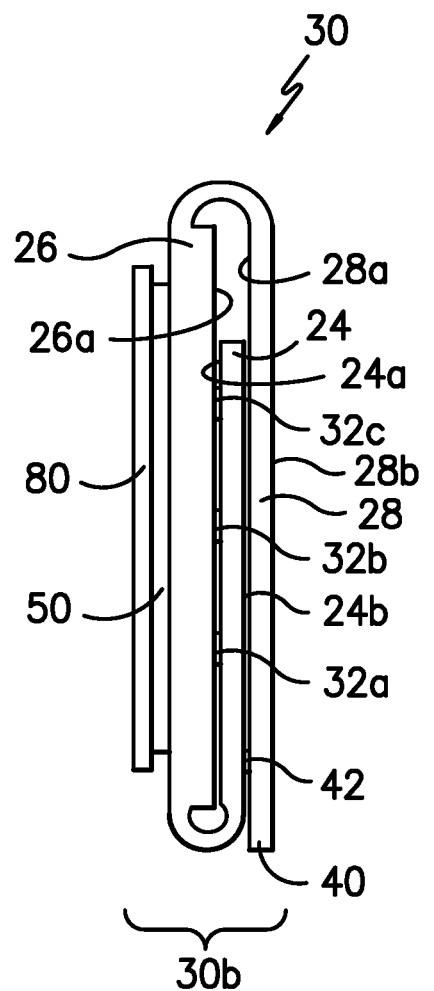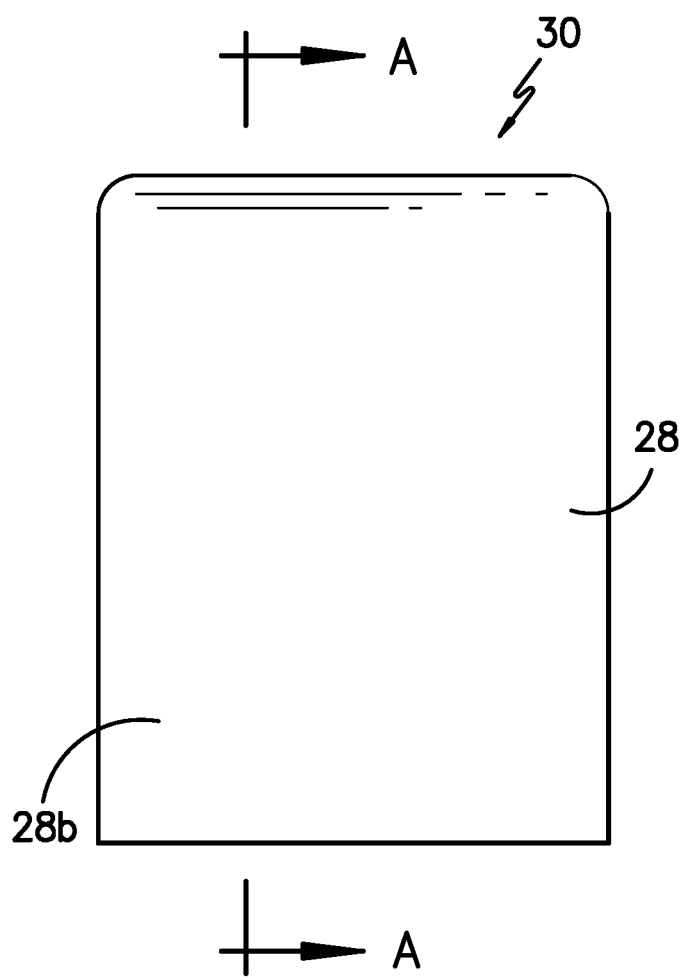
FIG. -3A-  FIG. -3B-

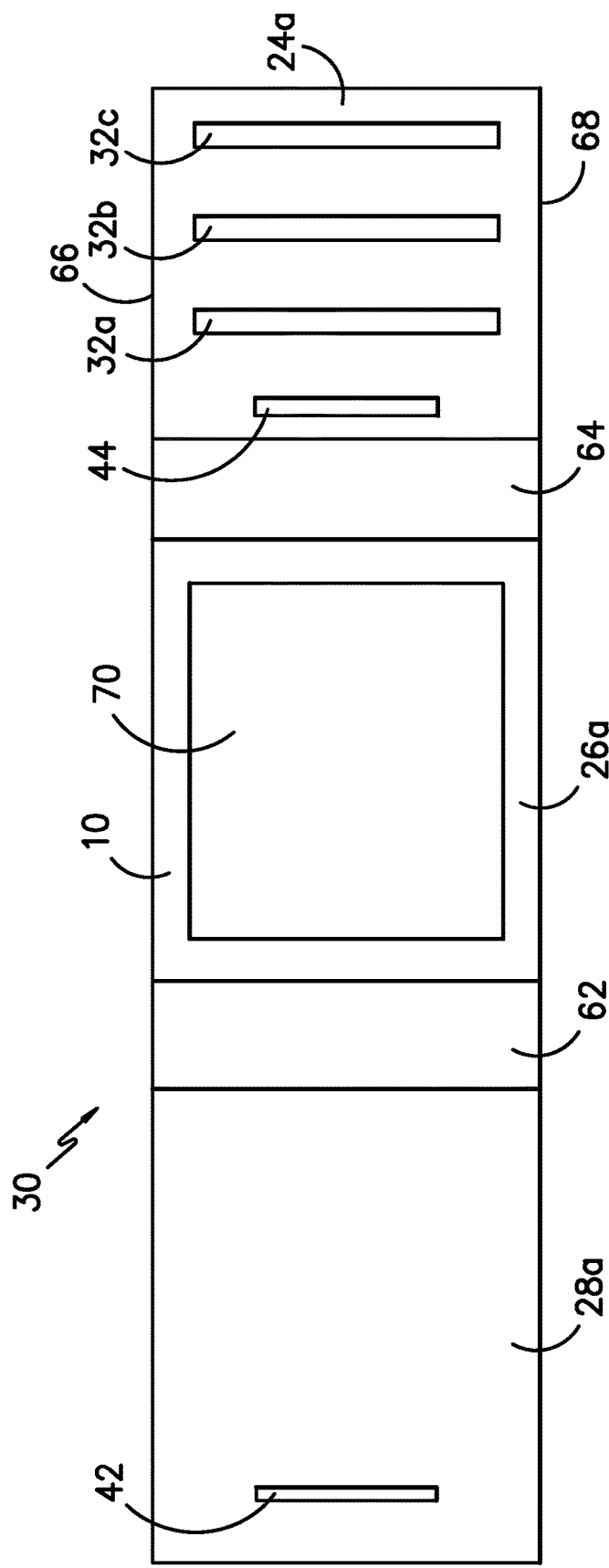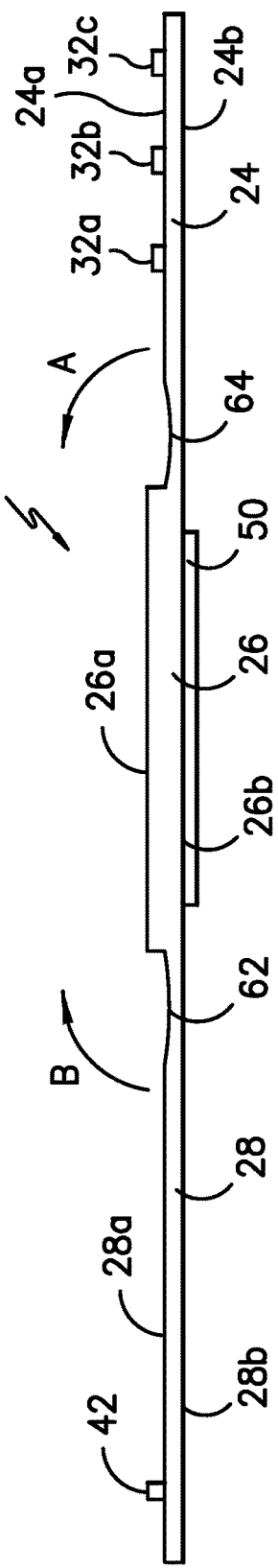
FIG. -4A-
FIG. -4B-

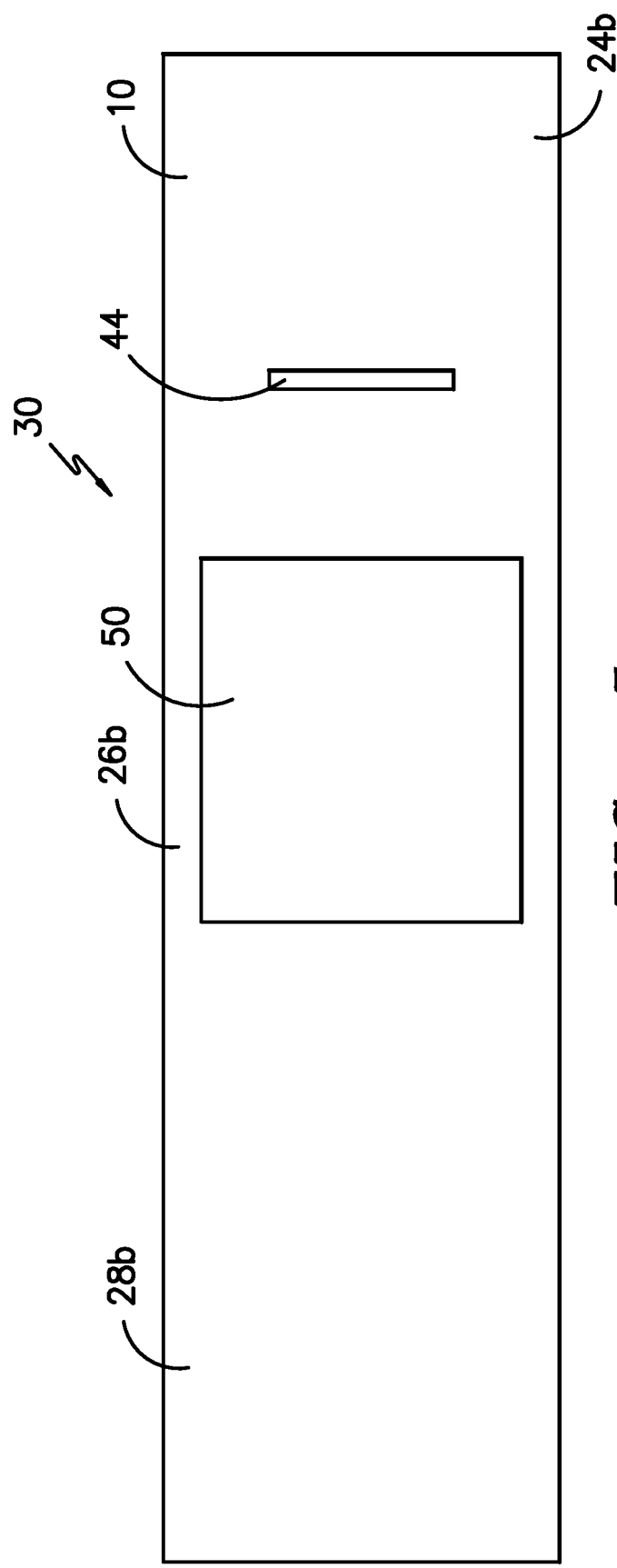
FIG. -5-
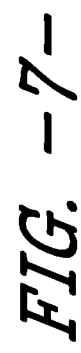
FIG. -7-
FIG. -6-

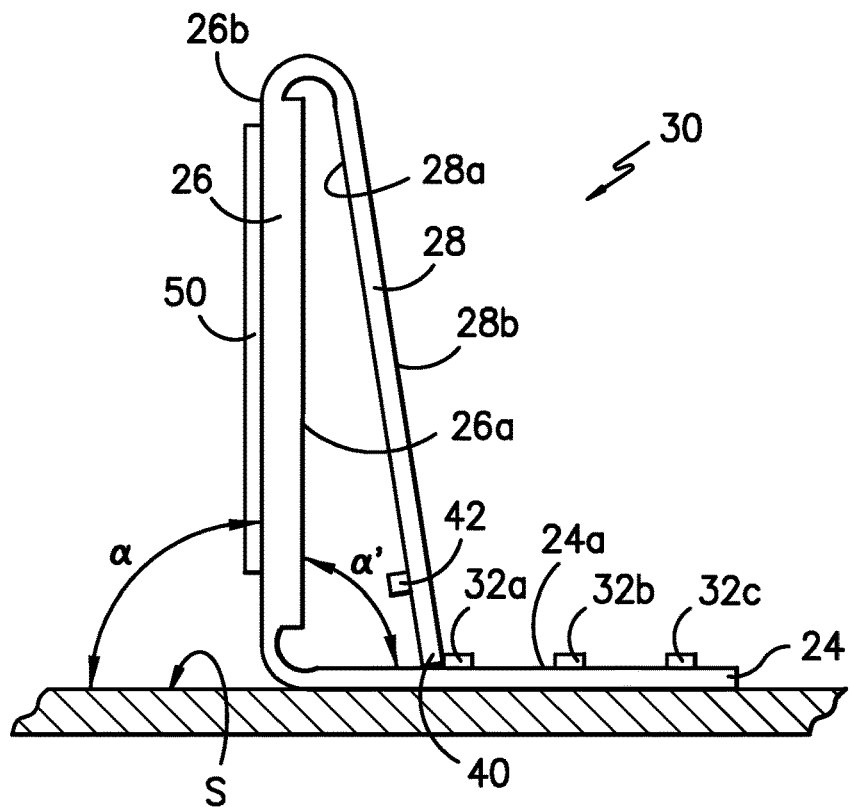
FIG. -8-
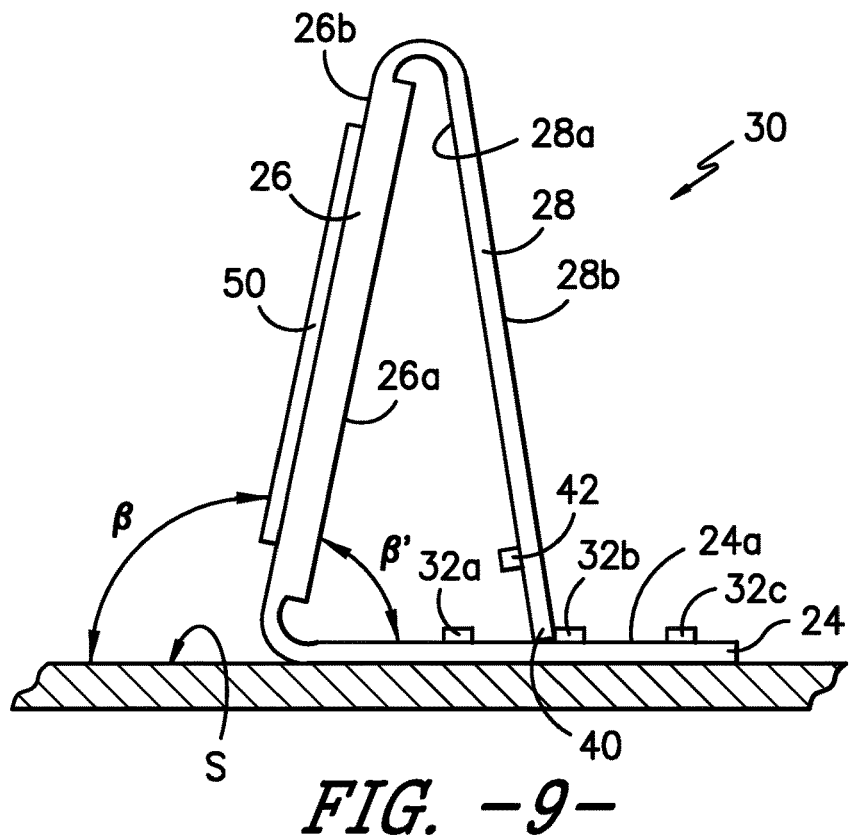
FIG. -9-

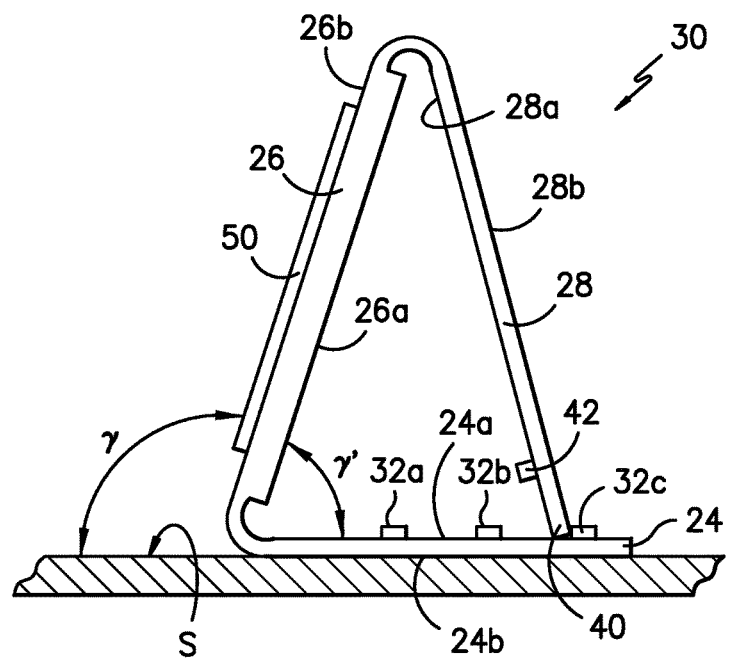
FIG. -10-
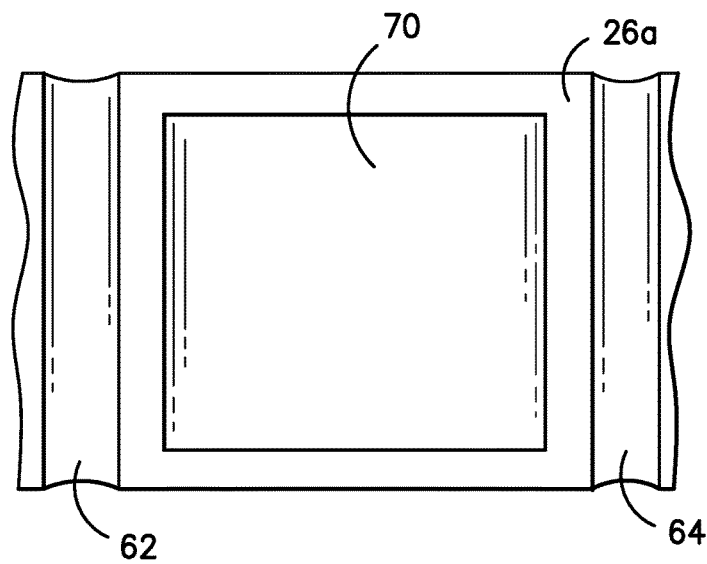
FIG. -11-

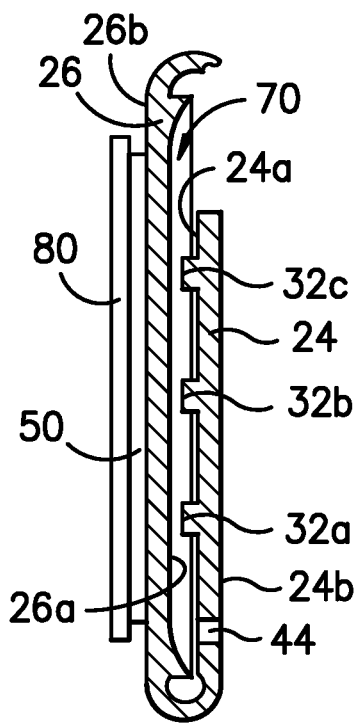
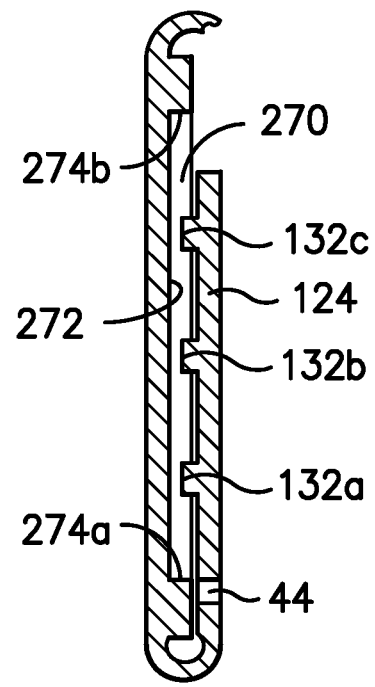
FIG. -12-        FIG. -13-
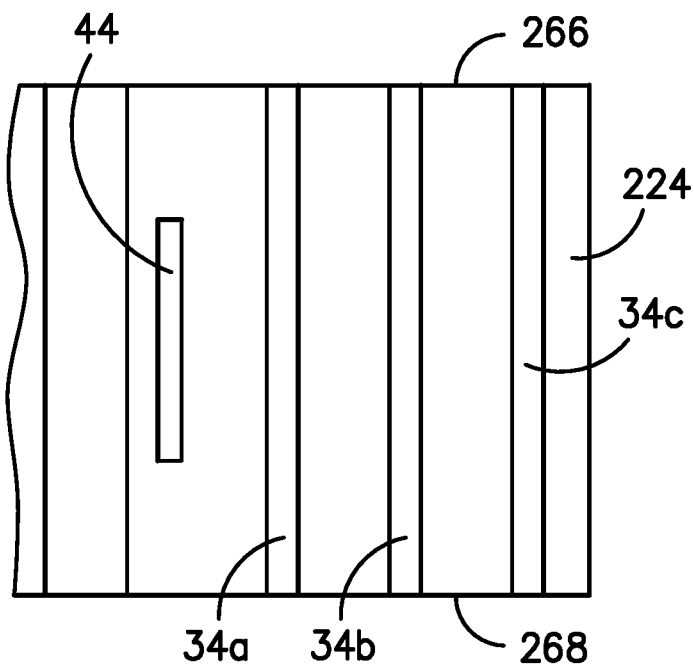
FIG. -14-

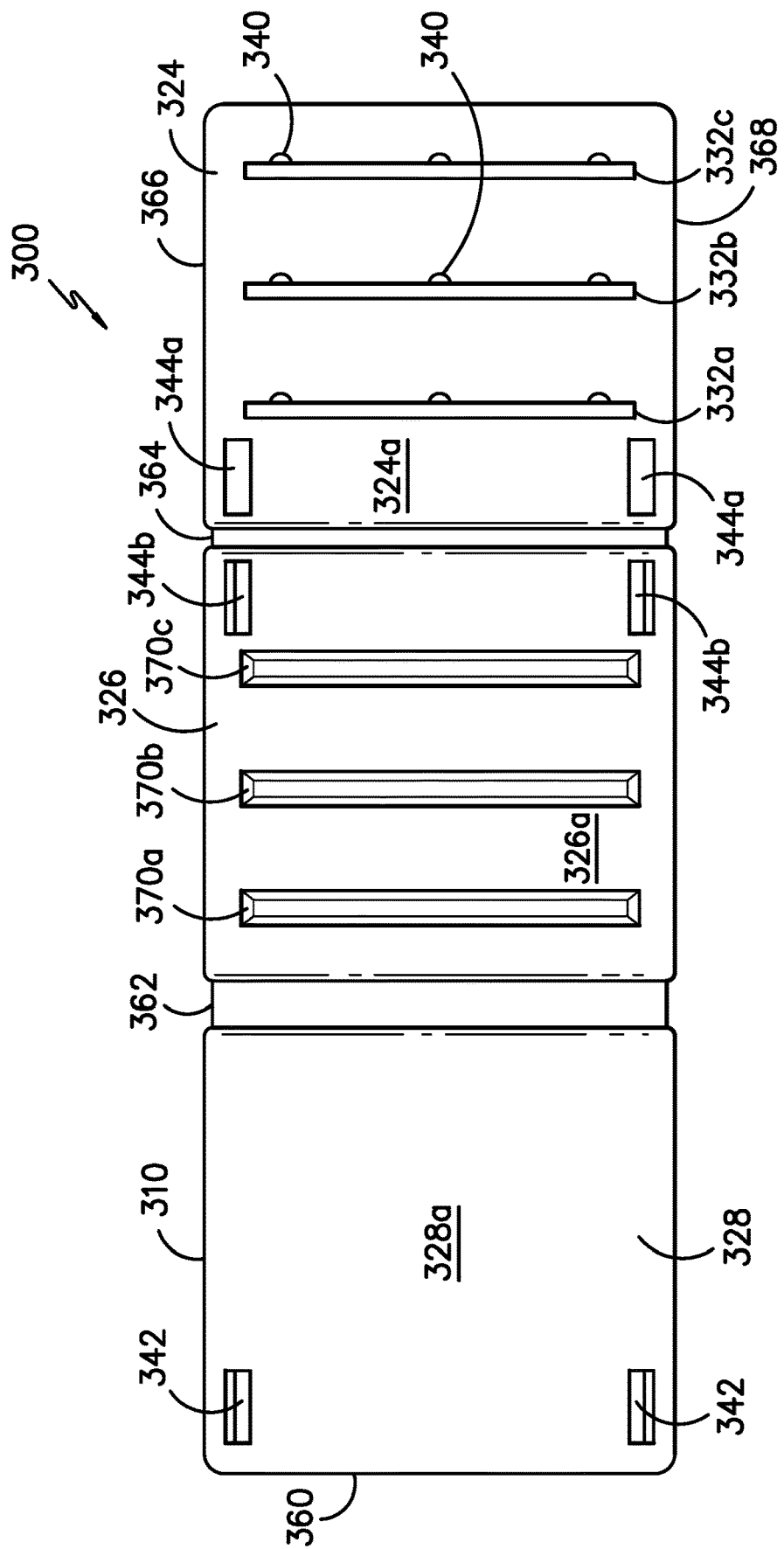
FIG. -15-

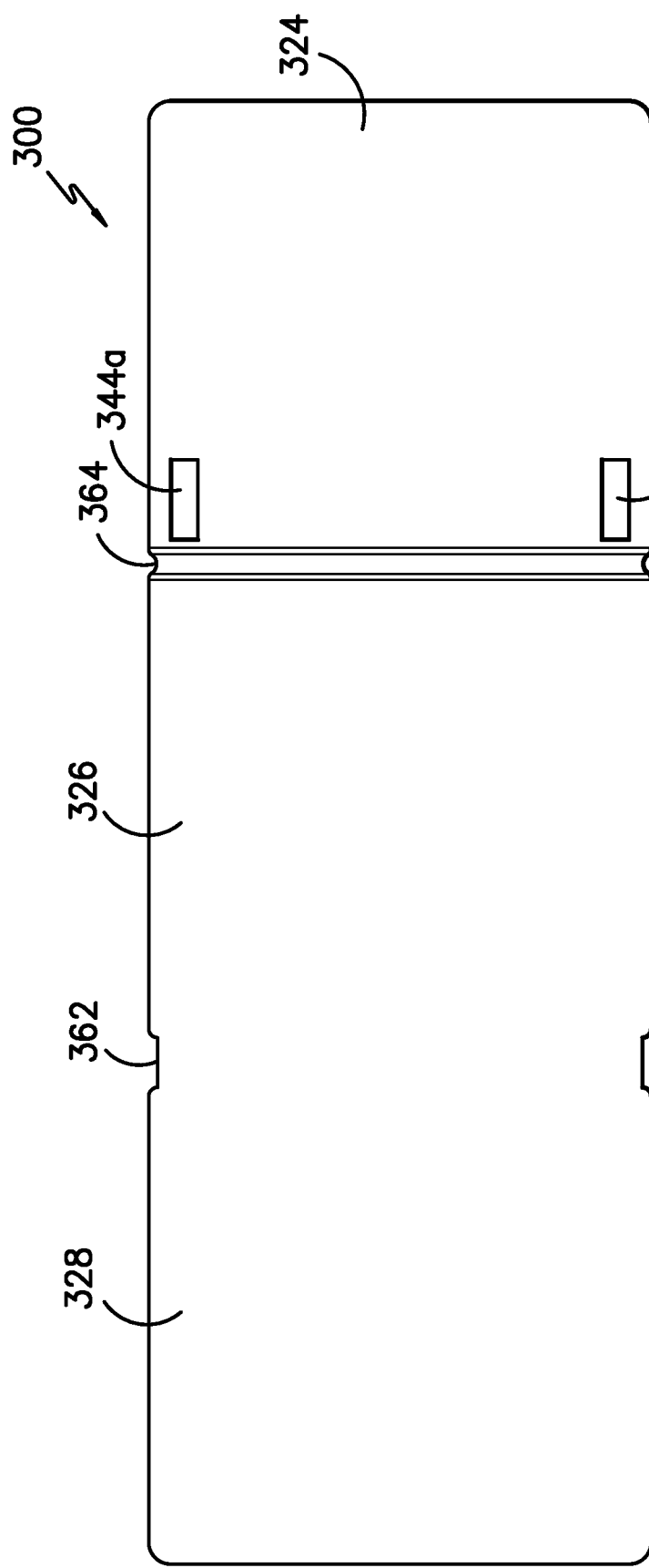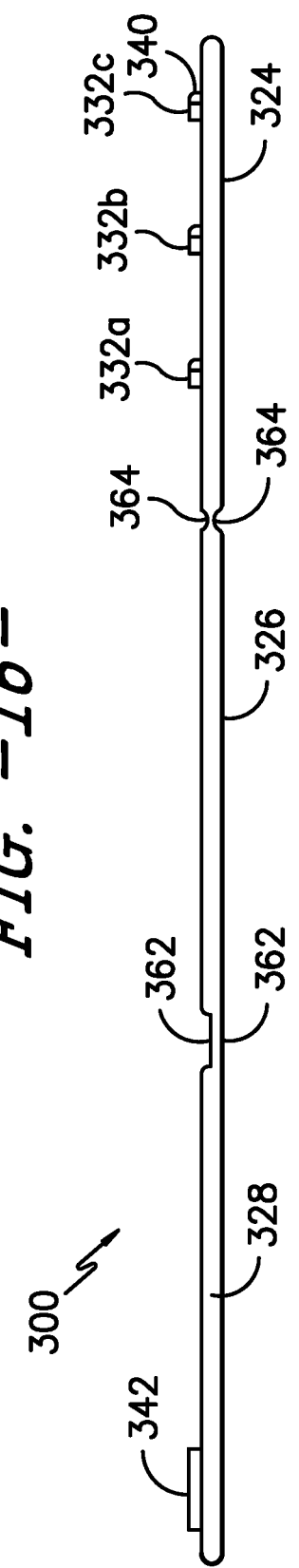

FOLDABLE MOBILE DEVICE STAND

CROSS REFERENCE TO RELATED APPLICATIONS

This application claims the benefit of U.S. Provisional Application No. 63/032,948, filed Jun. 1, 2020, and incorporated herein.

BACKGROUND

The invention relates to a foldable stand for a mobile device.

Stands for supporting mobile phones and other mobile electronic devices in a convenient position for use are well known. These stands support the device at convenient positions so that the device can be used at multiple angles while leaving a user's hands free. These stands exist in a variety of configurations including tripods with flexible legs and rigid multi-arm supports. Many of these stands are bulky and cumbersome and do not easily lend themselves to staying attached to the device when the device is placed in a pocket or a purse.

There remains a need for a stand that can position a mobile electronic device such as a mobile phone or a tablet at an angled position (e.g., an upright position), is sleek, has a compact configuration, and does not significantly increase the bulk of the device.

SUMMARY

In one aspect, the invention features a foldable stand that includes a planar member that includes three panels, the three panels including a positioning panel that includes an exterior surface, an interior surface opposite the exterior surface, and at least one stop extending from the interior surface of the positioning panel, a main body panel coupled to the positioning panel, the main body panel includes an interior surface and an exterior surface opposite the interior surface; and a support panel coupled to the main body panel, the support panel includes an exterior surface, an interior surface opposite the exterior surface, and a leading edge, the positioning panel being foldable against the interior surface of the main body panel such that, when folded, the interior surface of the positioning panel is in a facing relationship with the interior surface of the main body panel, the support panel being foldable against the exterior surface of the positioning panel such that, when folded, the interior surface of the support panel is in facing relationship with the exterior surface of the positioning panel, and the leading edge of the support panel being engageable with the at least one stop of the positioning panel. In one embodiment, when the leading edge of the support panel is engaged with the at least one stop and disposed between the main body panel and the at least one stop, the support panel, the main body panel and the positioning panel define a triangle when viewed from a side of the stand.

In another embodiment, the foldable stand includes at least three stops extending from the interior surface of the positioning panel.

In some embodiments, when the leading edge of the support panel is engaged against the first stop of the positioning panel, the interior surface of the main body panel and the interior surface of the planar support define an angle of from 90 degrees to 75 degrees.

In other embodiments, the interior surface of the main body panel includes a recess (e.g., a recessed receptacle extending into the depth of the main body panel) for receiving the at least one stop. In another embodiment, the interior surface of the main body panel includes a rectilinear receptacle extending into the depth of the main body panel and positioned to receive at least one stop when the foldable stand is in the folded positioned.

In other embodiments, the interior surface of the positioning panel includes at least three stops, each stop being spaced apart from the other stops.

In one embodiment, the stand further includes at least one male/female close mechanism (e.g., a fastener) that includes a male component and a female component, wherein one of the male component and female component is disposed on the support panel and the other of the male component and female component is disposed on the positioning panel. In another embodiment, the male component is disposed on the support panel, a female component extends through the positioning panel, and a female component extends into the main body panel. In some embodiments, the male component extends from the interior surface of the support panel and the female component is an opening extending through at least a portion of the positioning panel. In other embodiments, the male component extends from the interior surface of the support panel and the female component includes an opening extending through a depth of the positioning panel and a receptacle disposed on the main body panel for receiving the male component and maintaining the male component in a fixed position.

In another embodiment, the foldable stand further includes a close mechanism that includes a magnet. In another embodiment, the foldable stand further includes a close mechanism that includes a magnet and a metal plate.

In some embodiments, stand further includes an adhesive composition disposed on the exterior surface of the main body panel. In one embodiment, the stand further includes a release liner disposed on the adhesive composition.

In another embodiment, the stand further includes a hook and loop fastener system attached to the exterior surface of the main body panel.

In another embodiment, when the stand is in a folded closed position, the leading edge of the support panel extends beyond the length of the positioning panel.

In another aspect the invention features a foldable stand that includes a planar member that includes three contiguous panels defined by two fold lines, the three contiguous panels that include a positioning panel that includes an exterior surface, an interior surface opposite the interior surface, and at least one stop extending from the interior surface, a main body panel separated from the positioning panel by a first one of the two fold lines, the main body panel includes an interior surface and an exterior surface opposite the interior surface, and a support panel separated from the main body panel by a second one of the two fold lines, the support panel includes an exterior surface, an interior surface opposite the exterior surface, and a leading edge, the positioning panel being foldable against the interior surface of the main body panel at the first fold line such that, when folded, the interior surface of the positioning panel is in a facing relationship with the interior surface of the main body panel, the support panel being foldable against the exterior surface of the positioning panel at the second fold line such that, when folded, the interior surface of the support panel is in facing relationship with the exterior surface of the positioning panel, and the leading edge of the support panel being engageable with the at least one stop of the positioning panel. In one embodiment, when the leading edge of the support panel is engaged with the at least one stop, the support panel, the main body panel, and the positioning panel define a triangle when viewed from a side of the stand.

In another aspect the invention features a foldable stand that includes a planar member that includes three contiguous panels including a positioning panel that includes an exterior surface, an interior surface opposite the interior surface, and at least one stop extending from the interior surface, a main body panel that includes an interior surface and an exterior surface opposite the interior surface, a first living hinge disposed between the positioning panel and the main body panel, a support panel that includes an exterior surface, an interior surface opposite the exterior surface, and a leading edge, and a second living hinge disposed between the support panel and the main body panel, the positioning panel being foldable against the interior surface of the main body panel at the first living hinge such that, when folded, the interior surface of the positioning panel is in a facing relationship with the interior surface of the main body panel, the support panel being foldable against the exterior surface of the positioning panel at the second living hinge such that, when folded, the interior surface of the support panel is in facing relationship with the exterior surface of the positioning panel, and the leading edge of the support panel being engageable with the at least one stop of the positioning panel. In one embodiment, the main body panel includes at least one elongated receptacle extending into a depth of the main body panel, the at least one elongated receptacle being positioned and configured to receive the at least one stop. In another embodiment, the foldable stand includes at least two stops extending from the positioning panel, each of the at least two stops defining a generally rectilinear shape and the main body panel includes at least two elongated receptacles, each receptacle extending into a depth of the main body panel, a first of the at least two elongated receptacles being positioned and configured to receive a first of the least two stops and a second of the at least two elongated receptacles being positioned and configured to receive a second of the least two stops when the stand is in a folded position.

In some embodiments of the stand, when the leading edge of the support panel is engaged against a stop of the positioning panel, the interior surface of the main body panel and the interior surface of the planar support define an angle of 90 degrees.

The invention features a foldable stand that can maintain a mobile device, such as a mobile electronic device or a case for a mobile electronic device, in a desired position and is easily folded into a compact configuration.

Other features and advantages will be apparent from the following brief description of the drawings (where like reference numbers and designations in the various drawings indicate like elements), the description of the preferred embodiments, and from the claims.

BRIEF DESCRIPTION OF THE DRAWINGS

FIG. 1 is a perspective view of the stand in a partially folded position.

FIG. 2 is a right side elevational view of the stand of FIG. 1 in a first position with a mobile device positioned against a major surface of the stand.

FIG. 3A is a right side elevational view of the stand of FIG. 1 in a completely folded position with a release liner attached to the adhesive composition;

FIG. 3B is a back elevational view of the stand of FIG. 3A;

FIG. 4A is a top plan view of one embodiment of the stand of FIG. 1 in a fully unfolded position;

FIG. 4B is a right side view of the stand of FIG. 4A;

FIG. 5 is a bottom plan view of the stand of FIG. 4A;

FIG. 6 is right end view of the stand of FIG. 4A;

FIG. 7 is left end view of the stand of FIG. 4A;

FIG. 8 is a right side elevational view of the stand of FIG. 1 in a first position;

FIG. 9 is a right side elevational view of the stand of FIG. 1 in a second position;

FIG. 10 is a right side elevational view of the stand of FIG. 1 in a third position;

FIG. 11 is a partial top perspective view of the interior surface of the main body panel of the stand of FIG. 1;

FIG. 12 is a partial right side elevational view taken in cross section along line A-A of the stand of FIG. 3B;

FIG. 13 is a partial right side elevational view of a cross section of a main body panel in facing relation with a positioning body panel according to another embodiment of the stand; and FIG. 14 is a partial top plan view of the interior surface of another embodiment of the positioning panel.

FIG. 15 is a top plan view of another embodiment of the stand in a fully unfolded position;

FIG. 16 is a bottom plan view of the stand of FIG. 15; and

FIG. 17 is right side view of the stand of FIG. 15.

DETAILED DESCRIPTION

The foldable stand includes a planar member that is capable of being folded into a three-dimensional stand that can support a mobile electronic device, a case for a mobile device, or a combination thereof. In use, the stand is placed on a support surface and a mobile device (e.g., a mobile electronic device such as a phone, a tablet or a camera, a case for a mobile electronic device, or a mobile electronic device positioned in a case), is positioned against a major face of the stand. The device can be positioned on the stand in such a way that the device is held at an angle by the stand and the user does not have to hold the device to maintain the angle. When the device includes a mobile electronic device that includes a display or a camera, the device can be positioned on the stand in such a way that the display or camera is held by the stand at an angle (e.g., a desired viewing or recording angle), and the user does not have to hold the device to maintain the angle. The stand is suitable for positioning a mobile device to perform a variety of functions including, e.g., viewing, creating, and obtaining video images and still image content (e.g., videos, movies, and photographic images), listening and responding to audio (e.g., live discussions, recorded audio media, and combinations thereof).

Referring now to the drawings, and in particular to FIGS. 1-12, thereof, a foldable stand generally designated by the reference numeral 30 will be described. The stand 30, when in a partially folded position, is triangular in cross section and exhibits a shape akin to a triangular prism. The stand 30, when placed on a supporting surface, is capable of holding and maintaining a mobile device (D) at a desired angle. For ease of reference, the term mobile device (D) will be used herein. However, it is to be understood that each reference to a mobile device is also a reference to any mobile electronic device (e.g., phone, tablet, and camera), any case for a mobile electronic device, or a combination thereof, and that the term "mobile device" means a mobile electronic device, a case for a mobile electronic device, and combinations thereof.

The foldable stand 30 includes a continuous foldable planar member 10 that includes three generally rectangular panels 24, 26, 28: a first positioning panel 24, a second main body panel 26, and a third support panel 28. The panels 24, 26, 28 of the planar member 10 are separated by fold lines 62, 64. A first fold line 62 is disposed between the support panel 28 and the main body panel 26 and a second fold line 64 is disposed between the main body panel 26 and the positioning panel 24. Each fold line 62, 64 creates a living hinge about which its respective adjacent panels can be folded and unfolded. Preferably panels 24 and 28 of the stand 30 can be repeatedly folded and unfolded in toward panel 26 at the fold lines 62, 64 without causing the area of the fold line to weaken, crack or break apart. The fold lines 62, 64 preferably are predetermined fold lines that exist in the planar member 10 as it is supplied by the manufacturer. Alternatively, the fold lines can be created by a user when the user folds panels 24 and 28 of the planar member 10 in toward the main body panel 26 for the first time.

Each of the panels 24, 26, 28 of the planar member 10 includes an interior surface 24a, 26a, 28a and an exterior surface 24b, 26b, 28b opposite the respective interior surface 24a, 26a, 28a. The positioning panel 24 is coupled to the main body panel 26 and is capable of folding in toward the main body panel 26 in the direction of Arrow A, as illustrated in FIG. 4B. The support panel 28 is coupled to the main body panel 26 and is capable of folding in toward the main body panel 26 in the direction of Arrow B, as illustrated in FIG. 4B. The support panel 28 also is capable of folding over the positioning panel 24 when the positioning panel 24 is folded against the main body panel 26 such that the interior surface 28a of the support panel 28 is in facing relation with the exterior surface 24b of the positioning panel 24, as shown in FIG. 3. The leading edge 40 of the support panel 28 preferably extends even with or beyond the extent of the positioning panel 24 (i.e., the length of the support panel 28 preferably is greater than the length of the positioning panel 24) when the positioning panel 24 is folded over onto the main body panel 26 in such a way that the interior surface 24a of the positioning panel 24 is in facing relation with the interior surface 26a of the main body panel 26. The leading edge 40 of the support panel can be of any suitable configuration including, e.g., arcuate and linear.

The positioning panel 24 includes three positioning stops 32a, 32b, 32c disposed on the interior surface 24a thereof and extending away from the interior surface 24a. The stops 32a, 32b, 32c are positioned across the center portion of the positioning panel 24 and terminate prior to the edges 66, 68 of the positioning panel 24. The multiple stops 32a, 32b, 32c enable the stand 30 to hold the mobile device at multiple different angles to the support surface (S) on which the stand rests. The different angles are achieved by positioning the leading edge 40 of the support panel 28 between the main body panel and a stop, and against the leading edge 33a, 33b, 33c of the different stops 32a, 32b, 32c. Both the position of the first stop 32a relative to the main body panel 26 and the length of the support panel 28 are such that when the leading edge 40 of the support panel 28 is positioned between the main body panel 26 and the first stop 32a and against the leading edge 33a of the first stop 32a, the exterior surface 26b of the main body panel 26 forms an angle α (e.g., preferably an angle of 90 degrees, or even an angle of from 90 degrees to 105 degrees) with the plane of the surface (S) on which the stand 30 rests, and the interior surface 26a of the main body panel 26 forms an angle α' (e.g., preferably an angle of 90 degrees to 75 degrees) to the interior surface 24a of the positioning panel 24, as shown in FIG. 8. When a mobile device (D) is positioned against the exterior surface 26b of the main body panel 26 of a stand 30 when the main body panel is in this orientation, the mobile device (D) also extends at the angle α to the plane of the surface (S).

The second stop 32b on the positioning panel 24 is positioned a distance away from the first stop 32a such that when the leading edge 40 of the support panel 28 is engaged against the second stop 32b, the exterior surface 26b of the main body panel 26 forms an obtuse angle β with the plane of the surface (S) on which the stand 30 rests and the interior surface 26a of the main body panel 26 forms an acute angle β' with the interior surface 24a of the positioning panel 24, as shown in FIG. 9. When a mobile device is positioned against the exterior surface 26b of the main body panel 26 when the main body panel 26 is in this orientation, the mobile device (D) also extends at obtuse angle β to the surface (S) on which the stand 30 rests.

The third stop 32c is positioned a distance away from the second stop 32b such that when the leading edge 40 of the support panel 28 is engaged against the third stop 32c, the exterior surface 26b of the main body panel 26 forms an obtuse angle γ with the plane of the surface (S) on which the stand 30 rests, and the interior surface 26a of the main body panel 26 forms an acute angle γ' with the interior surface 24a of the positioning panel 24, as shown in FIG. 10. Obtuse angle γ is greater than obtuse angle β. When a mobile device positioned against the exterior surface 26b of the main body panel 26 when the main body panel 26 is in this orientation, the mobile device (D) also extends at obtuse angle γ to the plane of the surface (S) on which the stand 30 rests.

The main body panel 26 includes an interior surface 26a that is configured to accommodate at least a portion of the positioning stops 32a, 32b, 32c that extend from the interior surface 24a of the positioning panel 24 when the stand 30 is in the completely folded position 30b. Referring to FIGS. 11 and 12, the interior surface 26a includes a recessed portion 70. The recessed portion 70 is positioned to receive at least a portion of the positioning stops 32a, 32b, 32c, when the positioning panel 24 is folded against the interior surface 26a of the main body panel 26 such that the interior surface 24a of the positioning panel 24 is in facing relationship with the interior surface 26a of the main body panel 26. The presence of the recessed portion 70 can assist in decreasing the depth of the stand 30 when it is in its completely folded configuration, which creates a more compact and less bulky article. The recessed portion 70 is in the form of a concave surface for receiving at least a portion of the positioning stops 32a, 32b, 32c that extend from the interior surface 24a of the positioning panel 24. Although the recessed portion 70 has been shown as concave and having a smooth, arcuate side walls, the recessed portion can have a variety of configurations including, e.g., parallel linear walls and multiple recessed portions with a smooth, arcuate side walls, parallel linear walls, and combinations thereof. In one embodiment, the recessed portion 270 is a single recessed portion defined by a planar bottom wall 272 and parallel side walls 274a, 274b and at least a portion the stops 132a, 132b, 132c disposed on the positioning panel 124 extend into the recessed portion 270, an example of which is shown in FIG. 13.

In some embodiments, the stand 30 includes an adhesive composition 50 disposed on the exterior surface 26b of the main body panel 26, as shown in FIGS. 1-12. The adhesive composition 50 enables the mobile device to be held in a fixed position against the main body panel 26 of the stand 30. The mobile device can be adhered to the main body panel 26 of the stand 30 through the adhesive composition 50 such that either a mobile electronic device, a case for the mobile electronic device or both are directly adhered to the stand through the adhesive composition 50. Suitable adhesive compositions include, e.g., permanent adhesive compositions (e.g., adhesives that cause substrate failure when a removing force is applied), repositionable adhesive compositions (e.g., adhesive compositions that can be adhered to a mobile device, removed from the mobile device, and again adhered to a mobile device), removable adhesive compositions, and combinations thereof. The adhesive composition 50 can be present on the exterior surface 26b of the main body panel 26 in any of a variety of configurations including, e.g., a continuous layer, a discontinuous layer, a pattern, a random array, and combinations thereof, and can be in a variety of forms including, e.g., lines (e.g., linear lines, wavy lines, parallel lines, crossing lines, lines defining shapes such as polygons, and combinations thereof), dots (e.g., circular dots, elongated dots, hemispherical dots, arcuate dots, square dots, rectangular dots, triangular dots, and combinations thereof), and combinations thereof.

A release liner 80 optionally is disposed on the adhesive composition 50, an example of which is shown on the folded stand 30b of FIG. 3A. The release 80 liner can be removed from the adhesive composition 50 prior to attaching the stand 30 to a mobile device.

In some embodiments, the stand 30 includes a close mechanism (e.g., a male/female interlocking close mechanism (e.g., a fastener)) 42, 44. Referring to FIGS. 1-5 and 7-10, the interior surface 28a of the support panel 28 includes a male component 42 of a male/female fastener 42, 44. The positioning panel 24 includes a corresponding female component 44 of the male/female fastener 42, 44. When the stand 30 is in the closed position 30b, the male component 42 of the fastener 42, 44 on the support panel 28 engages the female component 44 of the fastener 42, 44 on the positioning panel 24 so as to maintain the stand 30 in a closed position 30b until an opening force is applied.

The fastener 42, 44 is in the form of an elongated snap mechanism 42, 44 in which the elongated snap 42 slides into the elongated opening 44 and remains held in the elongated opening 44 by a snap fit. To open the folded stand 30b, a user can pull on the leading edge 40 of the support panel 28 with sufficient force to cause the male component 42 to be pulled away from the female component 44 and to release the support panel 28 from engagement with the positioning panel 24. The elongated opening 44 extends through the entire depth of the positioning panel 24 and engages with the positioning panel 24. In other embodiments, the elongated opening 44 extends partially through the depth of the positioning panel 24 and engages with the positioning panel 24.

FIGS. 15-17 illustrate another embodiment of the stand 300 that includes a continuous foldable planar member 310 having arcuate corners and including three generally rectangular panels 324, 326, 328: a first positioning panel 324, a second main body panel 326, and a third support panel 328. The panels 324, 326, 328 of planar member 310 are separated by fold areas 362, 364 in the form of living hinges 362, 364. A first fold area 362 is disposed between the support panel 328 and the main body panel 326 and a second fold area 364 is disposed between the main body panel 326 and the positioning panel 324. Each fold area 362, 364 creates a living hinge about which its respective adjacent panels can be folded and unfolded. Preferably panels 324 and 328 of the stand 300 can be repeatedly folded and unfolded in toward panel 326 at the fold areas 362, 364 without causing the area of the fold to weaken, crack or break apart.

The positioning panel 324 includes three linear positioning stops 332a, 332b, 332c disposed on the interior surface 324a thereof and extending outward from the interior surface 324a of the positioning panel 324. The stops 332a, 332b, 332c are positioned across the center portion of the positioning panel 324 and terminate prior to the edges 366, 368 of the positioning panel 324. Each of the stops 332a, 332b, 332c include optional stabilizers 340 positioned along the linear extent of the stops. The optional stabilizers 340 assist in maintaining a stop 332a, 332b, 332c in a corresponding receptacle 370a, 370b, 370c. When present, any number of stabilizers can be included on a stop 332 including, e.g., zero, at least one, at least two, at least three, or even at least four stabilizers, and the number of stabilizers on each stop can vary such that the number of stabilizers on a first stop can be different from the number of stabilizers on a second or third stop. Alternatively, or in addition, at least one of the receptacles 370 can include a mating stabilizer that mates with a stabilizer on a corresponding stop. The two mating stabilizers function to further maintain a stop in a fixed position in a receptacle.

The main body panel 326 includes an interior surface 326a that is configured to accommodate the portions of the positioning stops 332a, 332b, 332c that extend from the interior surface 324a of the positioning panel 324 when the stand 300 is in the completely folded position. Referring to FIG. 15, the interior surface 326a of the main body panel 326 includes a three linear recessed portions 370a, 370b, 370c that function as receptacles for the positioning stops 332a, 332b, 332c. The recessed portions 370a, 370b, 370c are positioned to receive the positioning stops 332a, 332b, 332c, when the positioning panel 324 is folded against the interior surface 326a of the main body panel 326 such that the interior surface 324a of the positioning panel 324 is in facing relationship with the interior surface 326a of the main body panel 326. Although the recessed portions 370a, 370b, 370c have been shown as having generally planar walls that converge toward a central bottom wall, the recessed portion can have any configuration suitable for receiving the positioning stops 332a, 332b, 332c including, e.g., concave, smooth, arcuate side walls, parallel linear walls, and combinations thereof.

The stand 300 also includes a pair of male/female close mechanisms 342, 344a, 344b. The interior surface 328a of the support panel 328 includes two male components 342 of a male/female fastener 342, 344a, 344b. The positioning panel 324 and the main body panel 326 include openings 344a and 344b, respectively, that function as the female component of the male/female close mechanism 342, 344a, 344b. When the stand 300 is in the closed position, the male component 342 of the close mechanism engages the female components 344a, 344b on the positioning panel 324 and main body panel 326 and clicks into place in a locking configuration so as to maintain the stand 300 in a closed position until an opening force is applied to unlock the stand.

The close mechanism 342, 344a 344b is in the form of an open/close mechanism in which the male component 342 slides through opening 344a, which extends through the positioning panel 324, and into receptacle 344b and remains positioned in the opening 344a and held in the receptacle 344b by a snap fit against the interior surface of receptacle 344b. To open the folded stand, a user can pull on a portion of the stand, e.g., the leading edge 360 of the support panel, 328 with sufficient force to cause the male component 342 to disengage from the female components 344a, 344b and to release the support panel 328 from engagement with the positioning panel 324 and the main body panel 326. The openings 344a in the positioning panel 324 extend through the entire depth of the positioning panel 324. The openings 344b in the main body panel 326, extend through only a portion of the depth of the main body panel 326.

Other embodiments are within the claims.

In other embodiments, the exterior surface of the main body panel includes a lip extending from the exterior surface and capable of holding a mobile device in position against the exterior surface of the main body panel.

Although the stand has been shown as including an adhesive composition, an adhesive composition is optional. In alternative embodiments, an adhesive composition is provided as a kit for use in combination with the stand.

In another embodiment, the stand includes a mechanical fastener (e.g., a hook and loop fastener) for attaching a device to the stand. The optional mechanical fastener can be attached to the stand through an adhesive composition that is disposed on the exterior surface of the main body panel of the stand. A first member of the mechanical fastener (e.g., the exterior surface opposite the loop surface of a hook and loop fastener) can be attached to the stand through the adhesive composition, and the second member of the mechanical fastener (e.g., the hook surface of a hook and loop fastener) can be attached to the fastening surface (e.g., the loop surface of the hook and loop fastener) of the first member of the mechanical fastener. The mechanical fastener, in turn, can include a second adhesive composition disposed on an exterior surface thereof (e.g., the exterior surface opposite the hook surface of a hook and loop fastener). A release liner optionally is disposed on the second adhesive composition. The release liner can be removed to expose the second adhesive composition and the member of the mechanical fastener can be attached to an electronic device through the second adhesive composition.

Although the positioning panel has been shown as including multiple stops on the interior surface of the positioning panel, the positioning panel can include any number of positioning stops including, e.g., one, two, four, and five stops, and greater than five stops. In one embodiment, the stand includes one stop on the interior surface of the positioning panel. The one stop preferably is positioned such that the exterior surface of the main body panel forms a 90 degree angle, or even no greater than a 105 degree angle, with the surface on which the stand rests.

Although the stops on the positioning panel of the stand have been shown as terminating prior to the edges 66, 68 of the positioning panel 24, in other embodiments, the stops 34a, 34b, 34c extend from one side 266 of the positioning panel 224 to the opposite side 268 of the positioning panel 224, as shown in FIG. 14.

The stops can be continuous or discontinuous and can be of a variety of sizes and shapes including, e.g., arcuate, rectilinear, parallelepiped (e.g., cuboid, polygonal, and rhombohedron), mushroom, and combinations thereof. In some embodiments, the stops and the leading edge of the supporting panel are configured to engage with one another in a locking manner (e.g., an interference fit) such that a force is required to move the leading edge of the support panel out of engagement with the stop. The stops optionally can include at least one stabilizer that protrudes from the stop (e.g., on the linear extent of the stop or on at least one end of the stop) and assists in maintaining the stop in a corresponding recessed portion (e.g., 70) (e.g., receptacle) extending into the depth of the main body panel (e.g., 26) from the interior surface (e.g., 26a) thereof when the stand is in the completely folded position.

Although the stand has been shown as including a close mechanism, a close mechanism is optional. Although the close mechanism has been shown to be an elongated snap fit interlocking close mechanism, the close mechanism can be of any suitable mechanism and of any configuration including, e.g., interference fit (e.g., friction fit or press fit), hook and loop connectors (e.g., Velcro), elastomeric devices (e.g., elastic strands and an thermoplastic elastomeric bands), male/female connectors (e.g., interlocking discs, annular snap fit, cantilevered snap fit, torsional snap fit, and combinations thereof), magnetic (e.g., a magnet and a ferromagnetic metal plate, a first magnet having a first pole and a second magnet having the opposite pole, and combinations thereof), and combinations thereof. In addition, although the male component of the male/female close mechanism has been shown as being disposed on the support panel and the female component has been disclosed as extending through at least a portion of, and fully through, the positioning panel, and into a portion of the main body panel, in some embodiments, the male component can be disposed on the positioning panel and the female component can be disposed on or extend at least partially or fully through the support panel.

Although the planar member has been described as being a continuous member that includes three contiguous panels, in other embodiments the planar member includes three separate panels joined together by a mechanical device such as a hinge (e.g., barrel hinge, a pivot hinge, a spring hinge, and combinations thereof), tape (e.g., adhesive tape), a flexible band, and combinations thereof.

Although the panels have been described as having linear edges and being generally rectangular in shape, they can also have a variety of edges (e.g., arcuate), and define a variety of shapes including polygons (e.g., quadrilaterals (e.g., squares and rectangles), triangles, pentagons, hexagons and octagons), arcuate shapes (e.g., circles, ovals, and semicircles), and combinations thereof.

What is claimed is:
1. A foldable stand comprising:
a planar member comprising three contiguous panels comprising
a positioning panel comprising an exterior surface, an interior surface opposite the interior surface, and at least one stop extending from the interior surface;
a main body panel comprising an interior surface, an exterior surface opposite the interior surface, and at least one elongated receptacle extending into a depth of the main body panel, the at least one elongated receptacle being positioned and configured to receive the at least one stop of the positioning panel;
a first living hinge disposed between the positioning panel and the main body panel;
a support panel comprising an exterior surface, an interior surface opposite the exterior surface, and a leading edge; and
a second living hinge disposed between the support panel and the main body panel,
the positioning panel being foldable against the interior surface of the main body panel at the first living hinge such that, when folded, the interior surface of the positioning panel is in a facing relationship with the interior surface of the main body panel,
the support panel being foldable against the exterior surface of the positioning panel at the second living hinge such that, when folded, the interior surface of the support panel is in facing relationship with the exterior surface of the positioning panel, and the leading edge of the support panel being engageable with the at least one stop of the positioning panel.

2. The foldable stand of claim 1, comprising at least two stops extending from the positioning panel, each of the at least two stops defining a generally rectilinear shape, the main body panel comprising at least two elongated receptacles, each receptacle extending into a depth of the main body panel, a first of the at least two elongated receptacles being positioned and configured to receive a first of the least two stops, and a second of the at least two elongated receptacles being positioned and configured to receive a second of the least two stops.

3. The foldable stand of claim 1, comprising at least three stops extending from the interior surface of the positioning panel.

4. The foldable stand of claim 1, wherein, when the leading edge of the support panel is engaged against one of the at least one stop of the positioning panel, the interior surface of the main body panel and the interior surface of the support panel define an angle of from 90 degrees to 75 degrees.

5. The foldable stand of claim 1, wherein the interior surface of the positioning panel includes at least three stops, each stop being spaced apart from the other stops.

6. The foldable stand of claim 1 further comprising a male/female close mechanism comprising a male component and a female component, wherein one of the male component and the female component is disposed on the support panel and the other of the male component and the female component is disposed on the positioning panel.

7. The foldable stand of claim 6, wherein the male component extends from the interior surface of the support panel and the female component is an opening extending through at least a portion of the positioning panel.

8. The foldable stand of claim 6, wherein the male component extends from the interior surface of the support panel and the female component comprises an opening extending through a depth of the positioning panel, and
a receptacle disposed on the main body panel for receiving the male component and maintaining the male component in a fixed position.

9. The foldable stand of claim 1 further comprising a close mechanism comprising a magnet.

10. The foldable stand of claim 1 further comprising an adhesive composition disposed on the exterior surface of the main body panel.

11. The foldable stand of claim 10 further comprising a release liner disposed on the adhesive composition.

12. The foldable stand of claim 1 further comprising a hook and loop fastener system attached to the exterior surface of the main body panel.

13. The foldable stand of claim 1, wherein, when the stand is in a folded closed position, the leading edge of the support panel extends beyond a length of the positioning panel.

14. The foldable stand of claim 1, wherein, when the leading edge of the support panel is engaged with one of the at least one stop, the support panel, the main body panel and the positioning panel define a triangle when viewed from a side of the stand.

15. The foldable stand of claim 2, wherein, when the leading edge of the support panel is engaged with one of the at least one stop and disposed between the main body panel and the one of the at least one stop, the support panel, the main body panel and the positioning panel define a triangle when viewed from a side of the stand.

16. The foldable stand of claim 1, wherein, when the leading edge of the support panel is engaged against one of the at least one stop of the positioning panel, the interior surface of the main body panel and the interior surface of the support panel define an angle of 90 degrees.

17. The foldable stand of claim 1, wherein the at least one elongated receptacle is rectilinear.

* * * * *